MULTIPLE VIEWING SYSTEM FOR EDUCATIONAL TELEVISION AND THE LIKE

Filed Feb. 19, 1965 4 Sheets-Sheet 1

Sept. 17, 1968 M. M. SOLLIMA 3,402,262

MULTIPLE VIEWING SYSTEM FOR EDUCATIONAL TELEVISION AND THE LIKE

Filed Feb. 19, 1965 4 Sheets-Sheet 3

MULTIPLE VIEWING SYSTEM FOR EDUCATIONAL TELEVISION AND THE LIKE

Filed Feb. 19, 1965 4 Sheets-Sheet 4

United States Patent Office 3,402,262
Patented Sept. 17, 1968

3,402,262

MULTIPLE VIEWING SYSTEM FOR EDUCATIONAL TELEVISION AND THE LIKE

Mario M. Sollima, Colombes, Hauts-de-Seine, France, assignor to Compagnie Francaise Thomson-Houston, Paris, France, a corporation of France Filed Feb. 19, 1965, Ser. No. 433,999
Claims priority, application France, Feb. 21, 1964, 964,693
13 Claims. (Cl. 178—7.85)

ABSTRACT OF THE DISCLOSURE

A television receiver (12, FIGS. 1, 2) or a motion picture projector (20′, FIG. 4) is positioned overhead with its screen (18) or (or lens) directed vertically downward and surrounded by a light-shield (20). A plurality of mirrors (6) are, each, mounted in front of seated viewers and adjustable to reflect the vertical picture beam from the TV screen, or projector, into each individual viewer's eyes. (See FIG. 2.)

This invention relates to a multiple viewing system which will have its chief utility in connection with educational television and will hence be described hereinafter with particular reference to this specific purpose.

The advent of television has opened up vast prospects in education, both in primary schools and in higher education as well as professional tuition centers. One of the many outstanding results made possible by this and by no other educational method is the possibility for a single teacher of confirmed eminence in his field to profess a course to a nationwide audience, thereby quickly raising the general standard of education in a given country at little or no added expense to the nation's educational budget. These advantages are especially attractive at the present time in the many developing countries of the world which as a rule are sadly lacking both in trained teachers and in financial appropriations, whereas the need for rapid education therein is great. More especially as regards scientific curricula, television additionally provides an incomparable means of presenting the student with a vivid running illustration of the subjects being taught interspersed with the lecturer's explanations.

However promising in its principle, educational television has not, so far, gained the wide acceptance the above advantages would appear to warrant, owing to the many practical difficulties arising in connection with the receiving and display set up in the classroom or auditorium. The standard cathode-tube TV receiver set of the type used in homes would have many advantages, being relatively inexpensive, reliable, well-adapted for color reception, and giving a well-contrasted and bright image viewable in natural daylight and under normal artificial lighting conditions. However the image given by this type of TV set is drastically limited in size and gives rise to many difficulties referred to later.

Television projection systems are available which are capable of giving large-sized projected images on a screen. The so-called cathode tube projector system, in which the image from a small cathode ray tube receiver is optically projected on a wall screen, can only produce an image of very limited brightness and contrast owing to optical and electrical power limitations, so that the pictures can only be viewed in a darked room, thereby seriously limiting the usefulness of this type of device for work in a classroom. Moreover this type of system is not practically usable in color operation.

The so-called "Eidophor" system, in which the light from a powerful xenon arc source is modulated as it traverses a differentially electrified layer of a suitable oil, can be used to form a bright contrasted picture on a large screen and can be operated in color. Such a system is very satisfactory for use in a large auditorium, but its complexity, high initial and operating and maintenance costs, and its requirement for skilled operating personnel render it totally unsuitable for use anywhere but in the larger and more elaborate teaching centres.

It is an object of this invention to provide an improved viewing system adapted for use with standard CRT television receiver sets and which will completely overcome the limitations inherent to the images produced by such sets.

It should be understood that with a cathode-ray-tube television receiver there exists an optimum viewing distance which is about 2.5 meters in the case of the standard 625 scan line rate. When a viewer is positioned less than this distance away from the picture-tube screen, his eyes will resolve the scanning raster into its individual scan lines and will be subject to great visual fatigue without any gain in definition of detail. If positioned beyond the optimal distance of about 2.5 meters, detail is lost. The loss in detail as the viewer's distance from the screen increases above the optimal distance is very rapid. Tests have shown that the loss in detail totals about 50% at a distance of 3.5 meters, and 90% at 8 meters. It is seen therefore that the optimum viewing range with an ordinary television set is very critical indeed. In most cases this optimum range can be estimated to lie between about 2.20 and about 2.80 meters.

In conventional educational television installations the receiving sets are generally positioned along the walls of the classroom. One usual arrangement is to place two sets on either side of the blackboard, and possibly two more on the side walls of the room. With any arrangement of this general type it is clear that only a small number of pupils seated in the classroom will be actually positioned at an optimum viewing distance from a television screen. A majority will be situated well beyond that range, and a good many may be so far away from any receiver, say 8 to 10 meters away, that they can see practically nothing whatever of the televised programme.

It is an object and an outstanding result of the present invention, that it makes it possible in a simple, efficient and yet economical manner, to ensure that each of the members of a group of individuals seated in an auditorium or the like, are positioned in the optimum optical viewing range from a television screen to within very close tolerances.

Another serious difficulty encountered with conventional television viewing installations, especially for educational purposes, is that resulting from "glare" and reflection of extraneous light sources from the screen of the television set. Thus the reflected images of windows and ceiling lamps will often more or less completely obliterate the televised scene as far as a number of viewers are concerned. It is an object of the invention to eliminate this troublesome effect.

Another defect present in conventional educational television systems is that the line of sight of many of the viewers is masked part or all of the time by the backs and heads of their neighbours. This difficulty also is eliminated by the present invention.

The outstanding results outlined above as well as additional advantages that will become apparent, are achieved in accordance with the invention by providing a television receiver set positioned in overhead relation (e.g., supported from the ceiling of a classroom) with its picture tube screen directed in a generally vertical downward direction. A plurality of reflector members such as plane mirrors are supported separately and distinctly from the television receiver adjacent the seating accommodations for the individual viewers (e.g., supported from the pupils' desks), and are individually adjustable in position so as to reflect the picture beam issuing from the overhead television receiver into the eyes of the related viewer. The television receiver is operated so that the image formed on the screen thereof is inverted in relation to the televised original, whereby a true rectified image is reflected from each mirror into the eyes of the related viewer.

The invention will now be further described with reference to the accompanying drawings, wherein.

The applicant is aware that various proposals have been disclosed in the prior art for associating mirrors with television receiving sets in order to reflect the image formed on the screen of the picture tube towards the eyes of an observer. In these prior arrangements, the mirrors have usually been associated with the television receiver set itself for reflecting the image formed thereon towards one or more observers, rather than being separate and distinct from the television set and associated, instead, with the positions of the observers, as in this invention. The picture tube of the television receiver was not positioned overhead and directed vertically downward. These devices of the prior art were intended for such purposes as lengthening the optical path from the television tube screen to the observer, improving the brightness of the picture-bearing light beam by reflecting it from a reflective screen having appropriate optical characteristics, and the like. The prior devices were entirely incapable of accomplishing the unimpeded uniform-range multiple viewing made possible by the system of the present invention.

Reference will now be made to the drawings for an detailed description of the invention.

Figure 1:
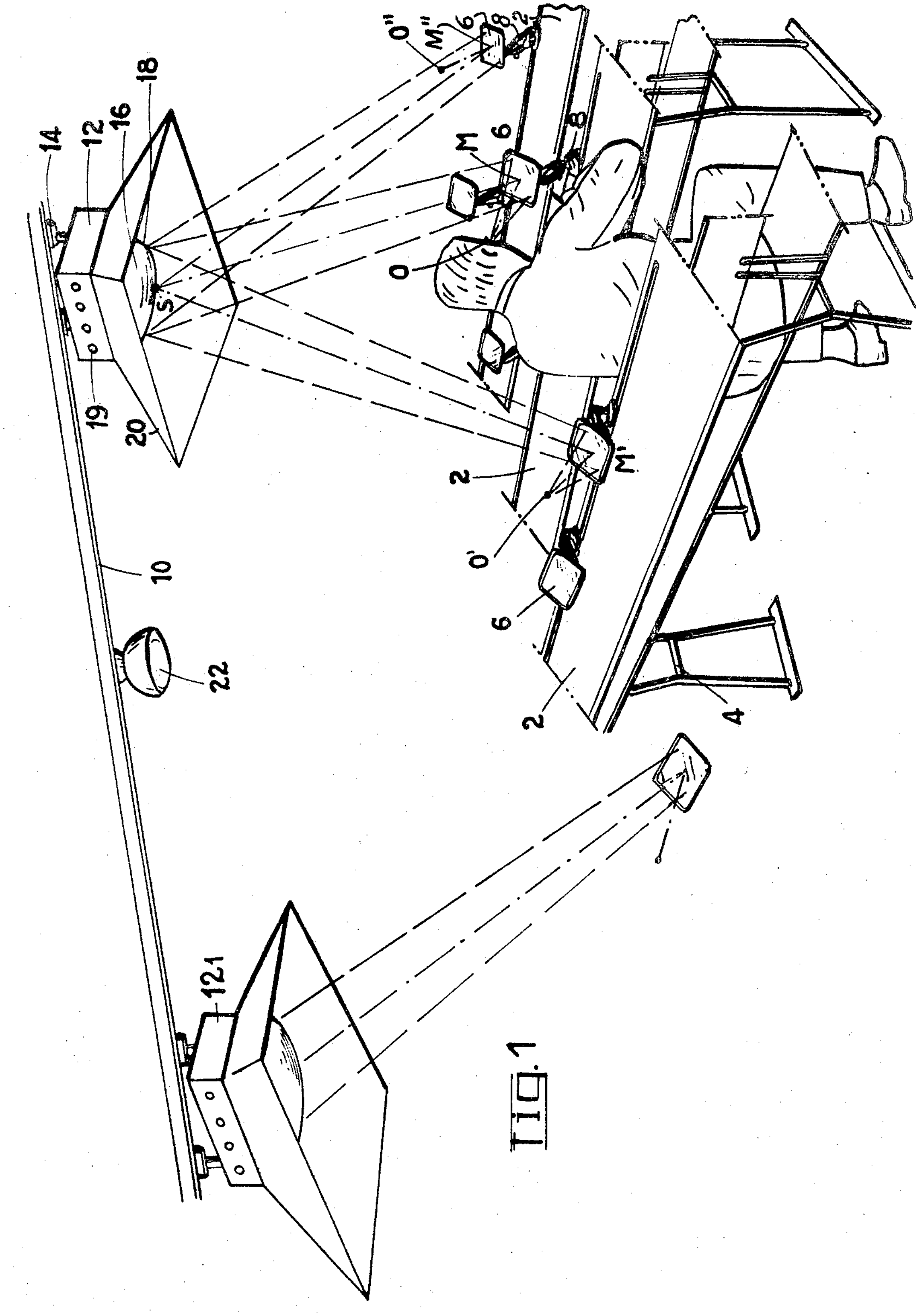
FIG. 1 is a perspective view of part of a classroom equipped with the multiple television viewing means of the invention.
Figure 2:
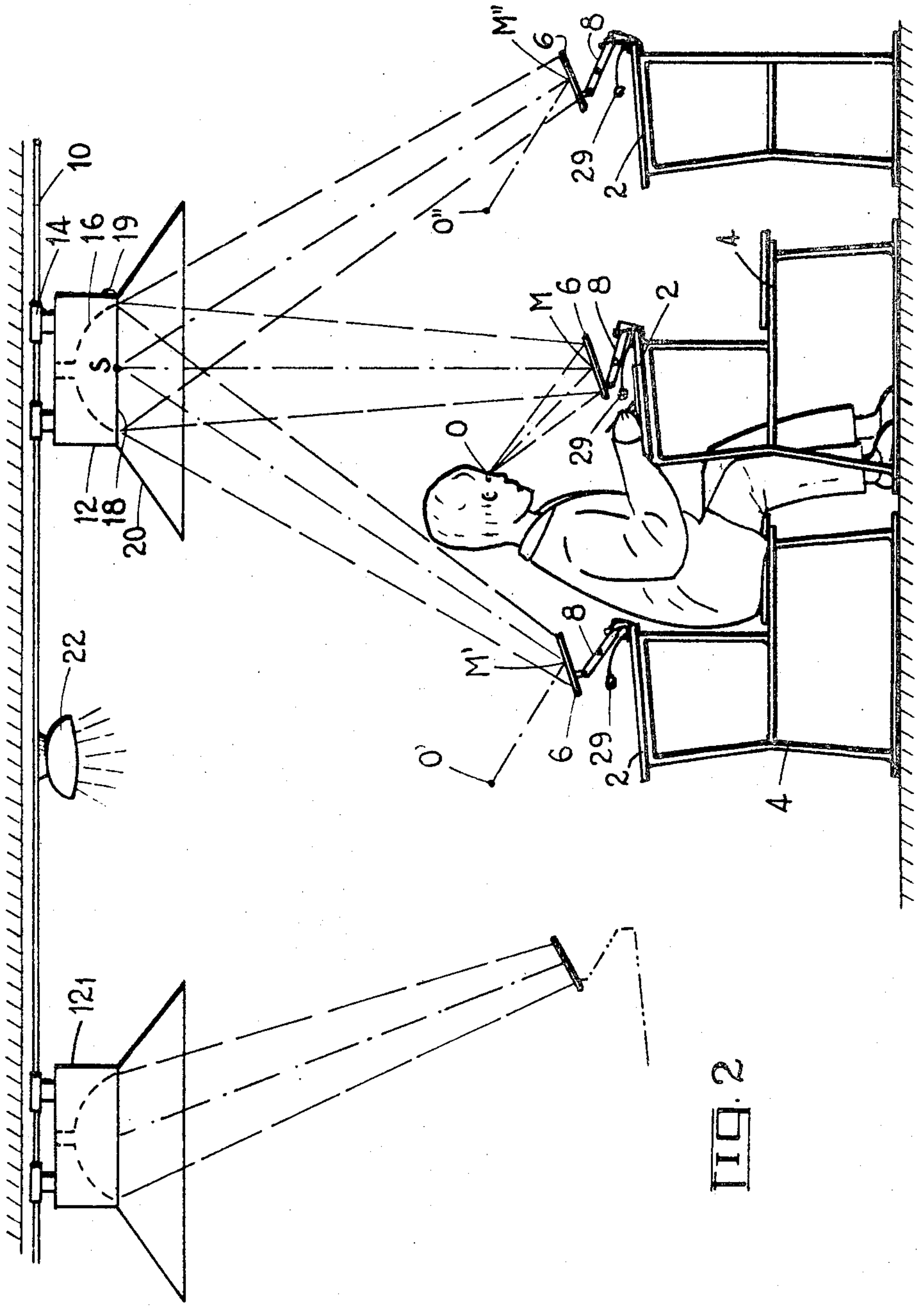
FIG. 2 is a simplified view in elevation of part of a classroom equipped with the multiple television viewing means of the invention.

There is illustrated in FIGS. 1 and 2 a classroom having rows of desks 2 and seats 4 arranged therein in a conventional way. Upon the desks 2 are mounted mirrors 6 on adjustable supports 8, to be described more in detail later, there preferably being provide one mirror 6 for each pupil accommodated on the seats or benches 4.

A pair of parallel horizontal bars or rails 10 are secured through suitable means not shown just below the ceiling of the room. A television receiver set has its housing 12 suspended from the rails 10, by way of lugs and collars 14 as here shown. The collars 14 are desirably arranged for sliding adjustment along the rails 10 to permit adjustment of the television sets in horizontal position. As shown, the picture tube 16 of the TV set is arranged vertically, with the fluorescent screen 18 of the tube being directed downward.

The scanning connections (not shown) of the cathode ray tube 16 are reversed with respect to normal in such a manner that the picture formed on the screen 18 is inverted with respect to the original being televised. All that is necessary in order to achieve this result in a conventional TV receiver, is to disconnect both horizontal deflection coil terminals from the related output terminals of the horizontal scanning generator, then cross over the connecting conductors, and reconnect them in reverse. This, as will be readily understood, has the result that the raster pattern on the television screen will be traversed by the electron beam in the reverse horizontal sense from that in which the raster pattern is traversed in the pick-up camera tube (e.g., from right to left instead of from left to right), so that the picture displaced on the receiver screen 18 is the mirror image of the picture being televised. In this way, the final pictures reflected in the mirrors 6 as will be presently understood, are viewed in their correct, rectified relation.

There is schematically indicated at 19 conventional controls for adjusting the tuning, scanning and other parameters of the TV receiver. It will be noted that these controls are not in a position to be readily tampered with by the viewers, a feature which is especially desirable in the case of children and teenagers.

A general control for switching all the receivers on and off (not shown) is preferably provided at the master's desk.

With the arrangement so far described, it will be apparent that each of the mirrors 6 can be adjusted on its support 8 so as to produce a virtual image of the picture formed on the fluorescent screen 18 of the TV picture tube which image will be reflected back into the eyes O of a person seated at the desk 2 on which said mirror is mounted. The television picture will then be framed in the mirror and will be seen as though it were positioned at a distance from the viewer's eyes equal to the sum of the distances $SM+MO$, i.e., the sum of the distances from the centre of the screen to the centre of the mirror and from the centre of the mirror to the viewer's eyes. It will be apparent also from a consideration of the optical paths of the visual rays as schematically indicated, that this total optical distance will be substantially identical as concerns each of a group of persons seated generally beneath a given TV set such as 12, for example, the three persons whose eyes respectively indicated at O', O, O'', and who are associated with the three mirrors M', M, M''. That being the case, it is clear that provided the vertical elevation at which the TV set is positioned has been correctly selected, the entire group of viewers served by the TV set 12, will view the television screen as if it were situated at very approximately the optimal viewing distance, i.e., the distance of about 2.5 meters earlier referred to, which in the case of a 625 line scanning raster is just far enough to prevent resolution between adjacent scanning lines while revealing maximum detail of the televised scene.

As shown in FIGS. 1 and 2 the television set 12 serves a group of desks 2 and associated mirrors 6 which is three deep. Along the horizontal dimension of the classroom which is normal to the plane of the FIGURE 1, the TV set 12 may serve, for example, five seats 4 and related mirrors 6, thus catering for fifteen pupils. It will be understood that the upper limit for the number of mirrors and viewers served by a common overhead TV set in an arrangement according to the invention, is set essentially by the consideration that the slant of the visual rays from the TV screen to the mirrors 6 associated with the outermost members of the group of viewers, should not be too great. The number of fifteen mentioned above constitutes a conservative figure, and tests have shown that highly satisfactory viewing is still obtained with a single overhead television set for a group of twenty-four viewers, arranged in a four by six array, or more. A satisfactory upper limit for the slant of the visual rays is about 45°.

In the case of a classroom or auditorium accommodating more persons than can be successfully served by a single overhead TV set, additional sets would, of course, be provided, as partly illustrated in FIGS. 1 and 2 at $12_1$. In such case, the TV sets would preferably be positioned near the ceiling in a horizontal array at the apices of a rectangular checker pattern, with each set serving an identical group of viewers, such as the $3\times5$ or the $4\times6$ groups mentioned above.

In order to improve the viewing of the TV pictures in the mirrors 6, each television receiver 12 is very desirably provided with light shield in the form of a downwardly flared skirt 20 diverging from its lower end around the picture screen 18, the inner surfaces of the skirt being provided with a dark nonreflective surface. The mirrors 6 are preferably so dimensioned that their contour is a rectangle similar to that of the screen 18, and that the image of said screen formed in the mirror that is closest to the TV set in each particular group, has apparent dimensions just small enough to be completely framed in the mirror. In these conditions, the TV pictures will appear in the mirrors surrounded by dark frames which are the images of the inner surfaces of light shield 20.

The dark skirt 20 not only serves to reduce the amount of light from extraneous sources striking the fluorescent screen 18, but also has an additional beneficial action in eliminating glare from any light sources provided on the ceiling of the room such as the lamp 22. Considering the visual field of each of the eyes of the viewer as defined by the mirror 6 acting as a diaphragm, it will be readily understood that the shield or shade 20 can be so dimensioned as to prevent the direct beam of light from any lamp 22 from penetrating into such field. Due to this dual function of the shade 20, the picture on the TV screen is found to appear in its frame within the mirror 6 with remarkable clarity and sharpness, both in normal daylight and artificial illumination, in a manner that cannot usually be paralleled when a television screen is being directly observed in normal circumstances.

Figure 3:
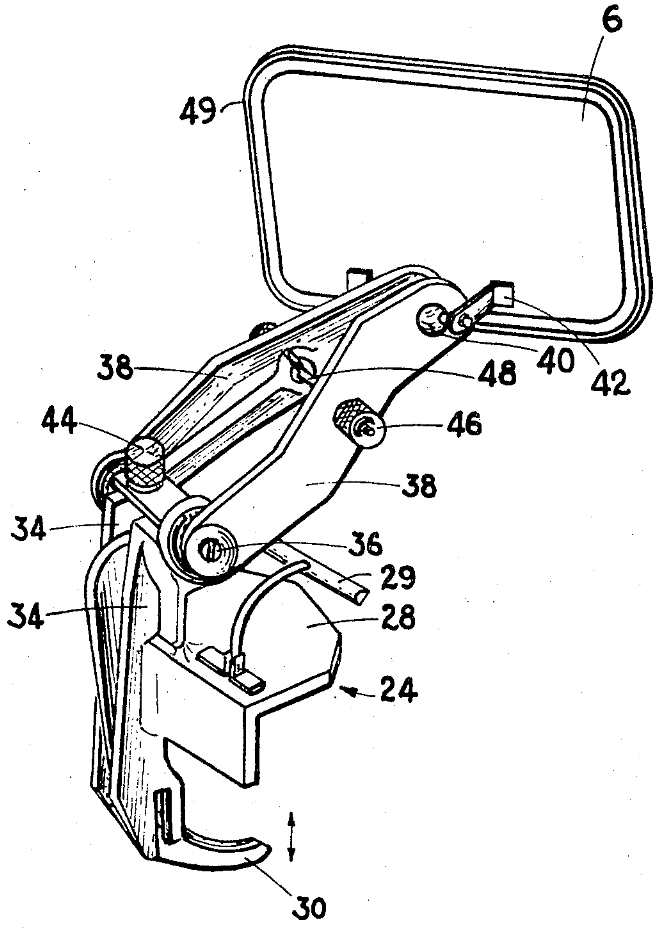
FIG. 3 is a larger-scale perspective view of one of the mirrors used according to an embodiment of the invention.

FIG. 3 illustrates one embodiment of an adjustable mirror assembly suitable for use in a system according to the invention. The mirror assembly includes a clamping bracket 24 having a fixed upper jaw member with a horizontally jutting flange 28 and a lower jaw member 30 movable up and down with respect to the upper jaw member as indicated by a double arrow. Such movement of the lower jaw 30 is effected through rotational adjustment of the knurled head 44 of a screw rod engaging a threaded hole (not shown) formed in member 30. In this way the edge of a table or desk such as 2 can be firmly but releasably clamped between the upper surface of lower jaw member 30 and the under surface of the flange 28. A pair of spaced lugs 34 upstanding from upper flange 28 have a pivot shaft 36 journalled across them, and the spaced lower ends of a pair of arms 38 are rotatably supported by the pivot shaft 36. The arms 38 converge V-wise towards their free upper ends, at which they are interconnected by means of a swivel assembly generally designated 40. The swivel assembly 40 may consist of a pair of opposed, part-spherical socket members (not shown) respectively attached to the inner surfaces of the upper ends of arms 38, and a ball element received between said sockets and secured to one end of a shank 42 the opposite end of which is secured to the rear surface of the frame of plane mirror 6. With this arrangement, it is clear that the plane of the mirror 6 can be adjusted in a generally vertical direction by rotation of arms 38 about pivot 36, and the mirror 6 can then be orientated to any desired angular position about the swivel joint 40. The adjusted setting of mirror 6 can be retained by acting on the knurled head 46 of a screw rod 48 interconnecting the arms 38 at an intermediate point thereof and preferably having a helical compression spring (not shown) surrounding said rod. Action on the screw head 46 to press arms 38 towards each other in opposition to the spring blocks the mirror 6 in its selected setting. Desirably the mirror 6 is fitted with a peripheral strip 49 of rubber or resilient plastic which is dark and nonreflective and contributes to protection of the mirror surface against shocks as well as enhancing the framing of the reflected TV image.

In order to derive full benefit from the excellent optical quality of the television pictures obtainable with the system of the invention, it is important that the mirrors 6 used should themselves be of a high optical grade both as concerns flatness and reflection factor.

In operation, it will be understood that each member of the classroom or auditorium seated at a desk 2 will adjust the mirror 6 before him to his convenience, both by rotation of arms 38 about pivot 36 to alter the elevation of mirror 6, and by universal rotation of the mirror 6 about its swivel joint 40, until he sees the image of the television screen 12 squarely framed in the mirror. The described adjusting means afford considerable flexibility of adjustment, and it will be realized that the desired framing of the TV picture in the mirror can be accomplished through angular orientation of mirror 6 about swivel joint 40 for various vertical positions of the mirror as determined by the angular setting of arms 38 about pivot 36, over a fairly wide range of these angular settings. This feature is advantageous for several reasons. First, it provides a means of compensating for variations in the optical distance from the TV screen 18 to the respective mirrors 6 in a common group, so as to obtain more nearly the precise optimal distance, as heretofore defined, throughout the group. Thus the support 8 of the central mirror 6 of the group may be adjusted to a lower elevation than the support 8 of each of the two mirrors shown to either side of it, thereby increasing the distance from said central mirror to the screen 18 somewhat. At the same time, the adjustability of the mirror supports 8 in elevation is convenient because it facilitates the achievement of unobstructed vision for each viewer irrespective of his own stature and that of his neighbour seated between his own mirror and the horizontal projection of the TV screen. It is found that with the arrangement disclosed, every member of the auditorium can quickly and easily adjust his mirror at the beginning of a lecture so as to get the desired optimal and unimpeded view of the overhead TV screen, in such a manner that normal head and body movements of neighbouring students will not subsequently interfere with his view.

It will be observed that the construction of the mirror assembly described with reference to FIG. 3 occupies a minimum amount of useful space on the desk surface, since the upper part of a book or a writing pad for example can be slipped underneath the mirror 6 and overhanging arms 38 while a lower part of the pad or book is being scanned for reading or writing.

Conveniently, a socket for a small electric bulb 29 (see FIGS. 2 and 3) may be associated with the support 8 under the back of mirror 6, e.g., being mounted upon the flange 28, to provide individual illumination dispensing with the overhead lighting means such as 22.

In an experimental set-up of a system according to the invention there were provided six television receivers arranged in two rows of three sets across the ceiling of the room. The screens of the sets were positioned at a common elevation of 2.80 meters above the floor. Each screen was dimensioned so that its diagonal was 59 cm. in length, and the TV sets were operated at a 625 scanning line rate. Each screen served to provide vision for fifteen mirrors arranged in three rows of five, and was framed in a frusto-pyramidal shield or shade 20 each of the four sides of which was 1.10 meters long, 0.85 m. wide and 0.30 m. in vertical depth. The mirrors 6 were 12 by 18 centimeters in useful dimensions, and were swivel mounted on the outer ends of pivoted arms 12 cm. in effective length.

In these conditions the effective optical distance of the televised picture as seen by an one of the viewers seated in the room was included within a range of from about 2.25 meters to about 2.75 meters. Substantially optimum viewing conditions were thus enjoyed by every individual in the room.

It will be understood that various modifications may be introduced into the invention as herein described and illustrated without departing from the scope thereof.

Thus the means for supporting the television sets may be so designed as to provide for adjusting the vertical elevation of the sets over a limited range. Some degree of angular adjustment of the sets may also be provided for, although the degree of angling thereof from the perpendicular direction should be limited if the main advantages of the invention are to be retained. Whenever the overhead supporting means for the TV sets are made adjustable, means should be associated therewith for firmly blocking the sets in an adjusted position.

The means for supporting the reflector members may differ from those shown in FIG. 3 and described above. It will be noted that the mounting means shown possess four degrees of freedom, i.e., three degrees of universal adjustment about the swivel joint 40 plus one degree of angular adjustment about the pivot 36. In some cases three degrees of freedom of adjustment may be found sufficient. On the other hand, more than four degrees of freedom may be provided if desired, as by arranging for rotational adjustment of the arms 38 about a vertical pivot on the bracket 24, in addition to the rotational adjustment about the horizontal pivot 36.

Figure 4:
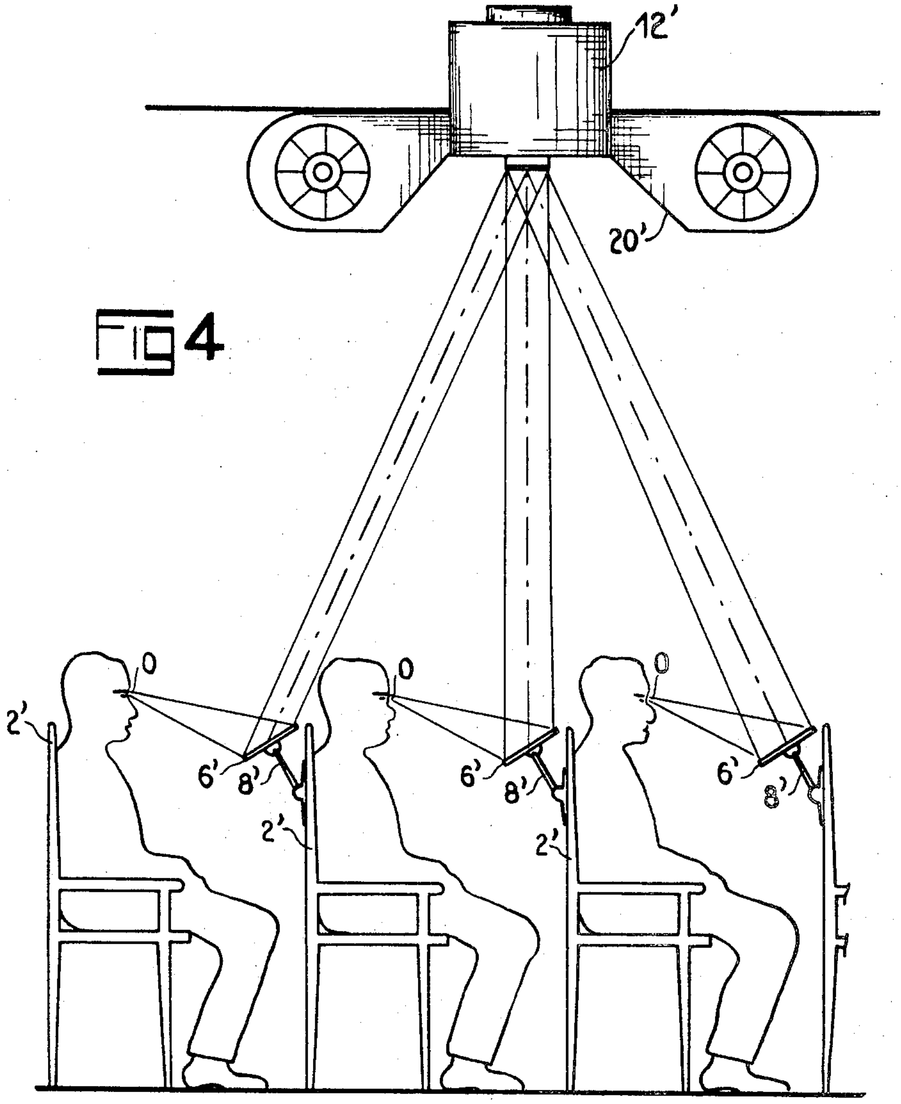
FIG. 4 is a partial view generally similar to FIG. 2, but relating to an embodiment of the invention using a motion-picture projector.

The system of the invention may be used with television receiving means of types other than those shown as using direct vision cathode ray tubes. Thus the TV sets used may be of a type involving optical projection of the televised image upon a screen, and it is to be understood that any statements made herein in regard to the screens 18 of the cathode ray tubes 16 in FIGS. 1 and 2 are to be interpreted as applying to the surface on which the picture to be viewed is formed, regardless of the precise nature of said surface or the manner in which the picture is formed upon it, i.e., optically or electronically. By the same token it will be apparent that the viewing system of the invention can be used to display cinematographic pictures rather than television pictures should this be desired. Such an embodiment of the invention is illustrated in FIG. 4, in which it will be seen that the television receiver 12 is replaced by a conventional cinema projector 12' similarly positioned from the ceiling of the room. Parts in FIG. 4 corresponding in function to parts in FIG. 2 are designated with the same references primed, so that further description is believed superfluous. However the main advantages of the invention are achieved with television in view of the existence of an optimum range for the viewing of a television screen as explained above.

The method of multiple viewing of the invention involving a vertical downward projection of the pictures from an overhead screen coupled with a reflection of the pictures from plural reflector members individually associated with the viewers (and separate and distinct from the picture producing means), possesses outstanding advantages for educational purposes. In addition to the unique advantage emphasized above of preserving the optimum viewing range for each member of an auditorium, it will be seen that the picture is delivered to each individual at an extremely convenient position such that he is enabled to follow the televised programme on his mirror and take down notes on a copy-book lying on his desk without having to move his head to any appreciable degree but only shifting his eyes between the mirror and the desk. At the same time he can retain an unobstructed view of a teacher or commentator physically present in the classroom as well as of a blackboard such as would be normally provided on the far wall of the room.

Because of the fleeting and ever-changing character of the images of a television display, an essential ingredient of the attractiveness of such a display and of its importance as a means of imparting knowledge, it is extremely important that each viewer should at all times retain an unobstructed view of the screen and not be obliged to twist and turn in order to catch glimpses of the screen through gaps between the bodies of persons around him. This additional result is accomplished by the invention to a degree unparallelled by present television viewing systems. For all the above reasons, the present invention is believed to accomplish a highly important advance in educational techniques.

The phrase motion-pictures, as used in the claims, is to be understood in a broad sense implying no limitation on the means by which the pictures are produced on the screen, so that the phrase extends to both the picture produced by a television receiver and by a cinematograph projector.

What I claim is:

1. A system for displaying motion pictures to an audience in premises having seating accommodations for said audience, comprising in combination:

at least one motion-picture producing unit including a screen and means for forming pictures on said screen inverted with respect to the pictures to be displayed;

means for supporting said unit in overhead relation above said seating accommodations with said screen directed in a generally vertical downward direction;

a plurality of reflector members for said audience;

and means for supporting said reflector members separately and distinctly from said unit and proximate to said seating accommodations, including means for individually adjusting said last-mentioned supporting means so as to reflect said pictures into the eyes of each member of the audience.

2. A system for displaying television in an auditorium having seats for a plurality of viewers, comprising in combination:

at least one television receiver unit including a cathode-ray picture tube having a screen and cathode ray scanning means therein connected for forming pictures on said screen inverted with respect to the pictures to be displayed;

means supporting said unit in overhead relation above said seats with said screen directed in a generally vertical downward direction;

a plurality of reflector members; and means supporting said reflector members separately and distinctly from said unit proximate to said seats including means for individually adjusting said last mentioned supporting means so as to reflect said pictures into the eyes of each seated viewer.

3. A system for displaying motion pictures in an auditorium having seat and table accommodations for a plurality of viewers, comprising in combination:

at least one motion picture-producing unit including a screen and means for forming pictures on said screen inverted with respect to the pictures to be displayed;

means for supporting said unit in overhead relation above said accommodations with said screen directed in a generally vertical downward direction;

a plurality of reflector members; and means for supporting said reflector members from said table accommodations including means individually associated with the supporting means of each reflector member for universal angular adjustment of each reflector member to reflect said pictures into the eyes of a related viewer.

4. The system defined in claim 1, including a light shielding device surrounding said screen and directed downward and outward from the periphery thereof, said light shielding device having a downwardly and inwardly directed surface which is dark and nonreflective.

5. The system defined in claim 1, wherein said reflector members are plane mirrors having a contour similar to that of the screen.

6. The system defined in claim 3, wherein the means supporting each reflector member includes a base attachable to a table top, swivel means permitting universal angular adjustment of the reflector, and further means permitting positional adjustment of the reflector member in elevation above said table top.

7. The system defined in claim 6, wherein said supporting means includes an arm angularly adjustable about a horizontal pivot on said base for said positional adjustment in elevation, and said swivel means is carried at the free end of said arm.

8. The system defined in claim 6, including a lamp supported by said supporting means beneath said reflector member.

9. The system defined in claim 2, wherein the means supporting said unit permits of limited positional adjustment of said unit and means are provided for blocking the supporting means in adjusted position.

10. The system defined in claim 1, including a plurality of said units distributed over the horizontal extent of said auditorium.

11. A system for displaying television in an auditorium having seat and table accommodations for a plurality of viewers, comprising in combination:

a number of television receiver units each including a cathode ray tube having a screen and deflection means in the tube operable to deflect the cathode rays so as to trace out across said screen a scanning raster at a prescribed line rate;

said deflection means being so connected that the scanning raster produces a picture inverted with respect to the picture to be displayed;

means supporting said units in overhead relation above said accommodations with said screens directed vertically downward at a predetermined elevation;

a plurality of reflector members; and means supporting said reflector members from said table accommodations including means individually associated with the supporting means of each reflector member for universal angular adjustment of each member to reflect said pictures into the eyes of a related viewer;

wherein said predetermined elevation of said screens is so selected and the supporting means of the reflector members are so dimensioned in regard to said prescribed line rate that the effective length of the optical path from said screens to each reflector member and thence to the eyes of each related viewer is approximately equal to the minimum distance at which adjacent scan lines on said screen are unresolved by an average viewer's eyesight.

12. The system defined in claim 11, wherein said prescribed line rate is substantially 625 lines, and wherein the base of the receiving screen is about 50 centimeters and wherein said effective length of the optical path is within an approximate range of from 2.20 to 2.80 meters for all the viewers.

13. The system defined in claim 11, wherein said units are so disposed in relation to one another and to said seating accommodations that the visual beams from any screen to the outermost reflectors of the group served by said screen inclined not more than about 45° to the vertical.

References Cited

UNITED STATES PATENTS

| | | | |
|---|---|---|---|
| 3,059,519 | 10/1962 | Stanton | 178—7.85 |
| 3,170,979 | 2/1965 | Baldwin | 178—7.85 |

FOREIGN PATENTS

| | | |
|---|---|---|
| 563,286 | 11/1923 | France. |

OTHER REFERENCES

Roe: Stereo movies without spectacles, American Cinematographer, July 1952, p. 295.

ROBERT L. GRIFFIN, *Primary Examiner.*

J. A. ORSINO, *Assistant Examiner.*